(12) United States Patent
Emens et al.

(10) Patent No.: US 6,434,548 B1
(45) Date of Patent: Aug. 13, 2002

(54) DISTRIBUTED METADATA SEARCHING SYSTEM AND METHOD

(75) Inventors: Michael Lawrence Emens, San Jose; Reiner Kraft, Gilroy; Peter Chi-Shing Yim, San Francisco, all of CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,737

(22) Filed: Dec. 7, 1999

(51) Int. Cl.$^7$ ................................................ G06F 17/30
(52) U.S. Cl. ............................ 707/3; 707/10; 709/202
(58) Field of Search ....................... 707/3, 10; 709/224, 709/202

(56) References Cited

U.S. PATENT DOCUMENTS

| | | | |
|---|---|---|---|
| 5,442,784 A | 8/1995 | Powers et al. | 707/102 |
| 5,832,500 A | 11/1998 | Burrows | 707/3 |
| 5,855,020 A | 12/1998 | Kirsch | 707/10 |
| 5,950,201 A | * 9/1999 | Van Huben et al. | 707/10 |
| 6,081,840 A | * 6/2000 | Zhao Yan | 709/224 |
| 6,212,545 B1 | * 4/2001 | Ohtani et al. | 709/202 |

OTHER PUBLICATIONS

Gavin McCormick, "FAST Claims it wins the search engine speed slalom", Mass High Tech, Aug. 30–Sep. 5, 1999, p. 7.

* cited by examiner

Primary Examiner—Thomas Black
Assistant Examiner—Cam-Linh T. Nguyen
(74) Attorney, Agent, or Firm—James C. Pintner; Jon A. Gibbons; Fleit, Kain, Gibbons, Gutman & Bongini P.L.

(57) ABSTRACT

A system and method of distributed metadata searching is disclosed. The present invention permits an extension of the searching and retrieval functions of existing Internet web search engines by utilizing computational resources embodied in user computer systems and search browsers. By distributing the searching and scanning functions to the user level, the present invention reduces the computational and communications burden on Internet web search engines and crawlers, resulting in lower computational resource utilization by Internet search engine providers. Given the exponential growth rate currently being experienced in the Internet community, the present invention provides one of the few methods by which complete searches of this vast distributed database may be performed. The present invention permits embodiments incorporating a Search Manger (1001) further comprising a Service Results Manager (1013), User Profile Database (1012), Service Manager (1013), and Service Database (1014); a Light Weight Application SCANNER (1002); and a Search Engine (1008). These components may be augmented in some preferred embodiments via the use of a Search Browser (1003), Internet Communications (1004); Web Site(s) (1005), Web Crawler(s) (1006), and a Repository Database (1007).

32 Claims, 12 Drawing Sheets

Exemplary System Architecture

Step 1: Traditional Crawlers First Collect Information for the Repository

Step 3: Search Performed, Results Presented, and SCANNER Activated

Step 4: SCANNER Gathers the Specified URL Information

Step 5: SCANNER Passes Results to MANAGER Which in Turn Updates Repository

FIG. 7    Exemplary Integrated Data Flow

PRESENT INVENTION

Exemplary System Architecture

DISTRIBUTED METADATA SEARCHING SYSTEM AND METHOD

CROSS-REFERENCE TO RELATED APPLICATIONS

Not Applicable

BACKGROUND OF THE INVENTION

1. Field of the Invention

The invention relates to the field of Internet Search Engines, Web browsers, and resource gathering and has special application in situations where these functions must be implemented in extremely large networks.

2. Description of the Related Art

One of the greatest challenges for a repository that contains summary data (metadata) of external data resources is to keep this metadata up to date. Currently the broad solution is to periodically exhaustively search (recrawl) the stored resources, summarize them and store the update summary data in the repository while replacing the old data. This produces a huge workload. Considering a repository with 100 million documents and an average download and process time of 30 seconds could lead also to a very time consuming experience.

The problem present with the prior art is the inherent difficulty for web crawlers to adequately search and process the vast amounts of information available on the Internet. Referring to FIG. 1, a typical web crawler (0101) would use one or more communication media (0111, 0112, 0113) with corresponding communication links (0121, 0122, 0123) to access a plethora of Internet web sites (0131, 0132, 0133) and thus incur 100% of the computing and time penalty cost for performing the search and organizing the data.

As stated previously, with the volume of data available on the Internet increasing at an exponential rate, the resources required to perform this search and organizing effort is substantial and becoming a significant burden on Internet web search engines. While current approaches to this problem involve the use of additional web crawlers (0101), this represents an unacceptable cost burden on Internet search sites given the recent trends towards nonlinear data growth in the Internet.

Accordingly, a need exists for a method and a system to permit reduction of the resources required for Internet search engines and their corresponding data retrieval and organization tasks.

SUMMARY OF THE INVENTION

The present invention is related in the area of today's Internet search engines consist roughly of two major parts. One part is responsible for resource gathering. The other part handles the information storage and indexing. The present invention addresses one problem that arises while working on resource gathering using web crawlers or gatherers.

By using a parallel architecture for the gatherers and using new approaches (distributed team crawling), the amount of time to perform a complete web search and index can be dramatically reduced. However, it still takes a considerable amount of time and resources to keep the repository up to date. Adding more resources is generally the sole responsibility of the search engines owners. The present invention seeks to reduce the time and resources spend by the search engine companies by placing some of the resource gathering tasks in the hand of the user's web browser. The present invention would typically load a small program (e.g. Java applet) into the browser that would perform some specified resource gathering and summarization (lightweight task). A user of the search engine would still perform all the steps they currently perform in activating a search, including: starting at the home page of the search engine; typing some keyword(s) and selecting "start search"; and viewing the results screen and selecting from the results.

The present invention could be loaded for as many URL's as the search engine owner decides. However, to the user of the search engine the present invention does not need to appear graphically and may operate as a background task. With the present invention in place, a small program is loaded into the user's Internet browser and can be directed to perform several information gathering tasks such as: crawl a specified URL; inform the search engine if the site has updated since a particular date; and inform the search engine of any changes to web data since a particular date.

The present invention generally operates within the context of the user's computer on a voluntarily basis. Possible motivation for the user to participate in this searching methodology could include (but not be limited by) the following:

Free membership (receive free reviews, articles, research material, free notification service of search results) from the Internet Search engine;

Some reward (based on a specific amount of donated computing resources he/she receives a free T-Shirt, book, CD, etc.);

Though participation the search engine will be more up to date and provide improved of search accuracy. In this manner users of the search engine community may actively help to improve the search quality by their participation.

Because the present invention can be implemented in Java (Sandbox model, etc.) it is secure and cannot inflict any damage to the user's computer, because it has no write access to the user's storage systems. Processing results will be sent to the web server using a network connection. Furthermore, Java applets are already a common standard and enjoy a high acceptance among Internet users.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF AN EMBODIMENT

Figure 1:
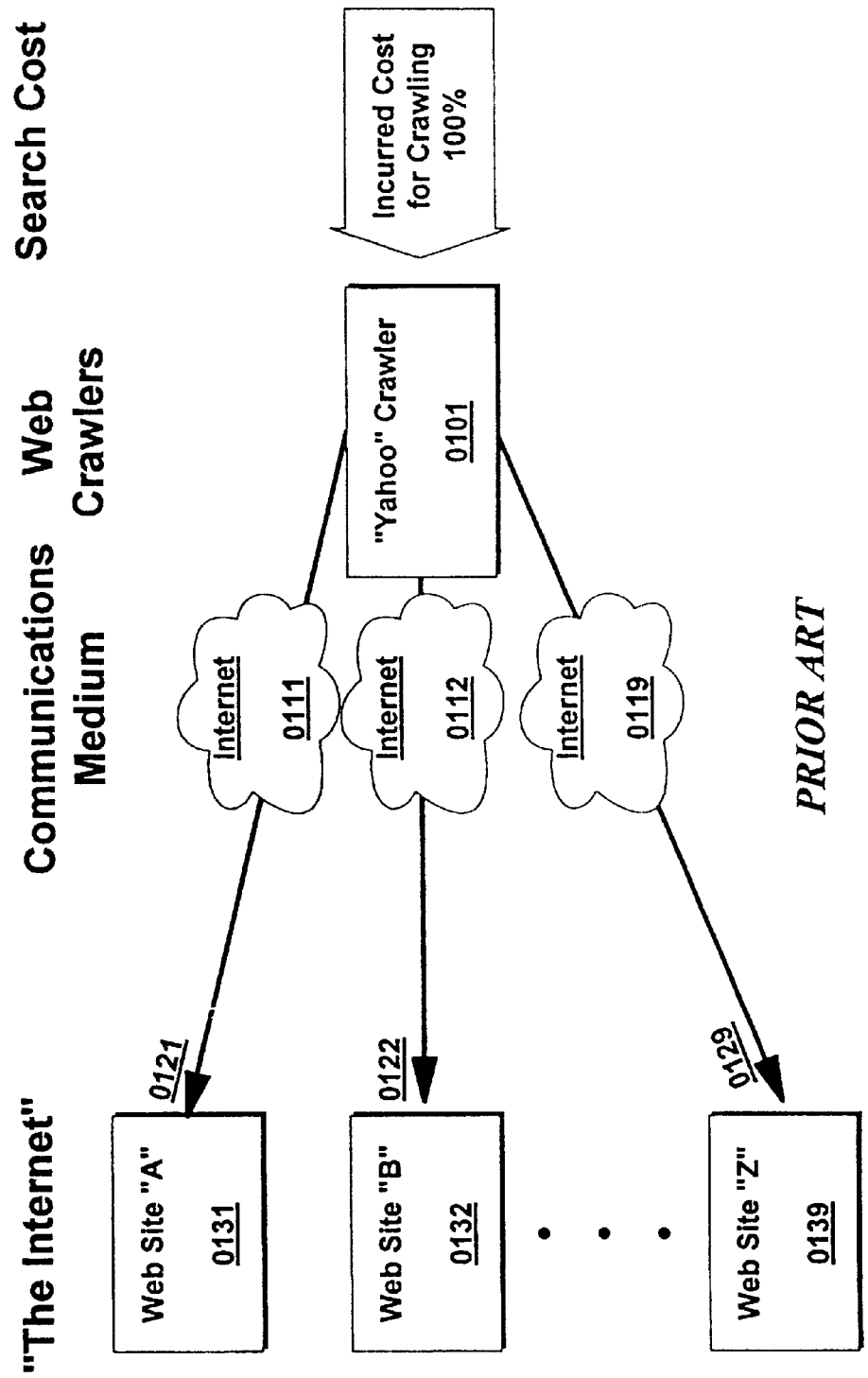
FIG. 1 illustrates a conventional prior art web crawler system, indicating that the incurred cost of traversing all the Internet sites is placed solely on the Internet search engine.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiments, wherein these innovative teachings are advantageously applied to the particular problems of this present invention. However, it should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

Definitions

Throughout the discussion in this document the following definitions will be utilized:
System Blocks/Procedural Steps Not Limitive The present invention may be aptly described in terms of exemplary system block diagrams and procedural flowcharts. While these items are sufficient to instruct one of ordinary skill in the art the teachings of the present invention, they should not be strictly construed as limiting the scope of the present invention. One skilled in the art will be aware that system block diagrams may be combined and rearranged with no loss of generality, and procedural steps may be added or subtracted, and rearranged in order to achieve the same effect with no loss of teaching generality. Thus, it should be understood that the present invention as depicted in the attached exemplary system block diagrams and procedural flowcharts is for teaching purposes only and may be reworked by one skilled in the art depending on the intended target application.
Personal Computer Not Limitive Thoughout the discussion herein there will be examples provided that utilize personal computer (PC) technologies to illustrate the teachings of the present invention. The term 'personal computer' should be given a broad meaning in this regard, as in general any computing device may be utilized to implement the teachings of the present invention, and the scope of the invention is not limited just to personal computer applications. Additionally, while the present invention may be implemented to advantage using a variety of Microsoft™ operating systems (including a variety of Windows™ variants), nothing should be construed to limit the scope of the invention to these particular software components.
Internet/Intranet Not Limitive Throughout the discussion herein the terms Internet and Intranet will be used generally to denote any network communication system or environment. Generally the term Intranet will denote communications that are local to a given system or user, and Internet will describe communications in a more distant local. One skilled in the art will recognize that these terms are arbitrary within the contexts of modern communication networks and in no way limitive of the scope of the present invention.

Data Flow

The present invention method may best be understood by referencing the data flow diagrams of FIGS. 2–7. These diagrams will now be discussed in detail.

Figure 2:
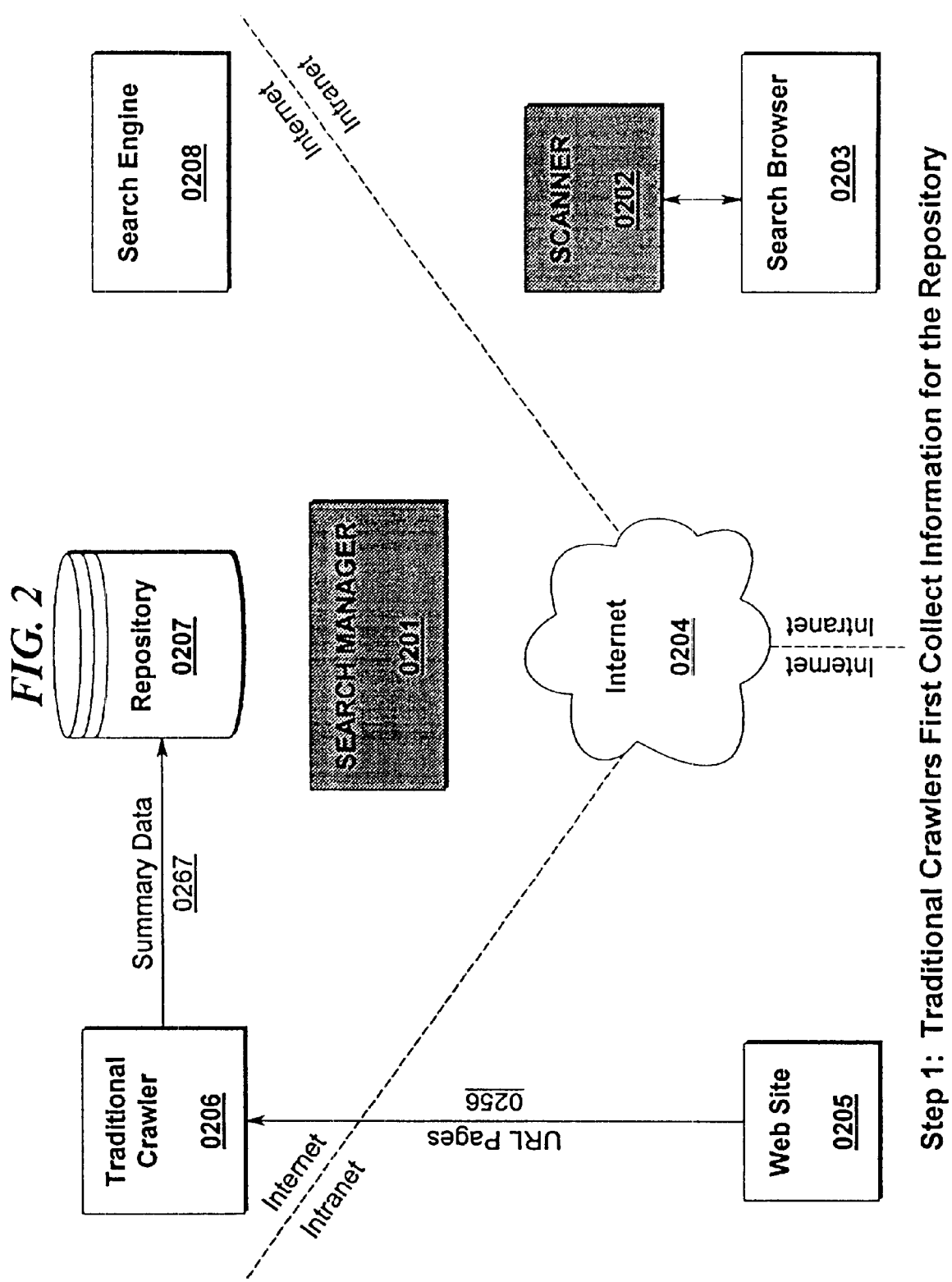
FIG. 2 illustrates a system block data flow diagram of an exemplary embodiment of the present invention, indicating the first step of the metadata collection process.

Referencing FIG. 2, the first step in the search process begins with traditional web crawlers (0206) obtaining URL pages (0256) from a variety of web sites (0205). Summary data (0267) from these URL pages (0256) is then deposited in a repository (0207).

Figure 3:
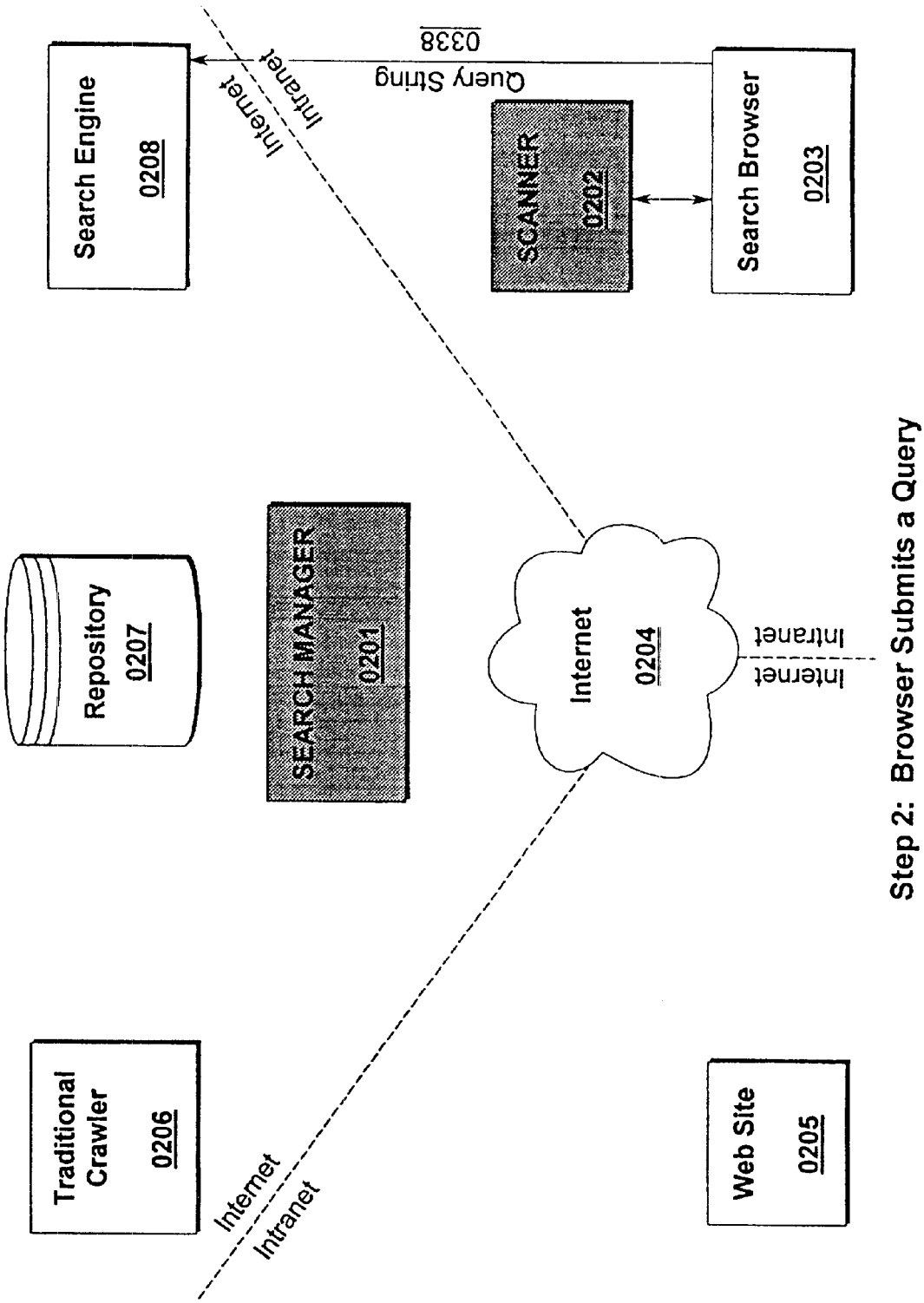
FIG. 3 illustrates a system block data flow diagram of an exemplary embodiment of the present invention, indicating the second step of the metadata collection process.

Referencing FIG. 3, the second step in the search process is initiated by the search browser (0203) generating permitting entry of a query string (0338) that is transferred to a remote search engine (0208). This query string may take a variety of forms depending on the type of search inquiry being generated.

Figure 4:
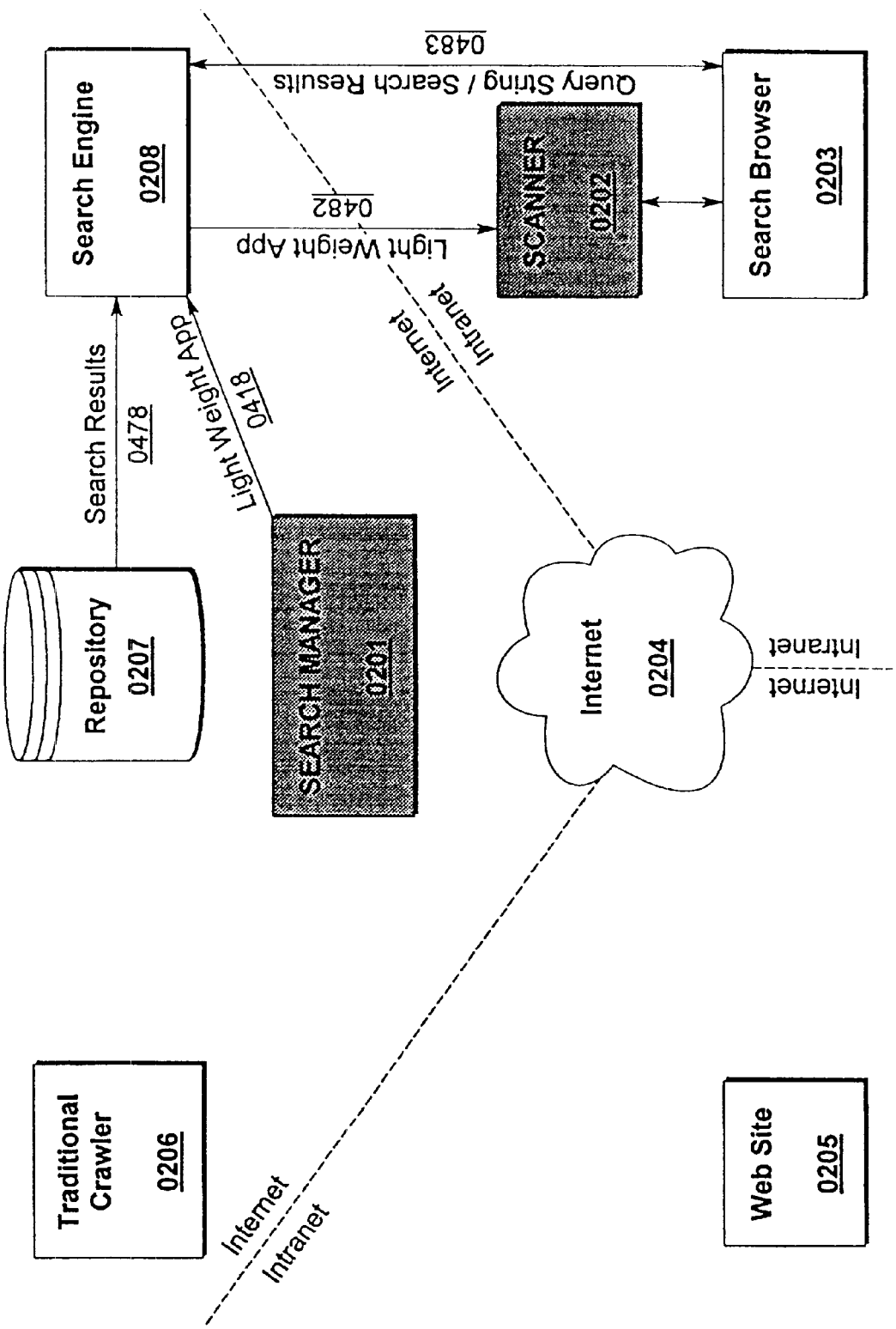
FIG. 4 illustrates a system block data flow diagram of an exemplary embodiment of the present invention, indicating the third step of the metadata collection process.

Referencing FIG. 4, the third step in the search process requires that the search results (0207) be retrieved from the repository (0207) by the search engine (0208) and returned (0483) to the search browser (0203) for presentation. Additionally, a Light Weight SCANNER (0202) application is downloaded (0482) to augment the search browser (0203), permitting the search results to be later summarized. The search engine (0208) also incorporates a search manager (0201) function via a local Light Weight Application (0418).

Figure 5:
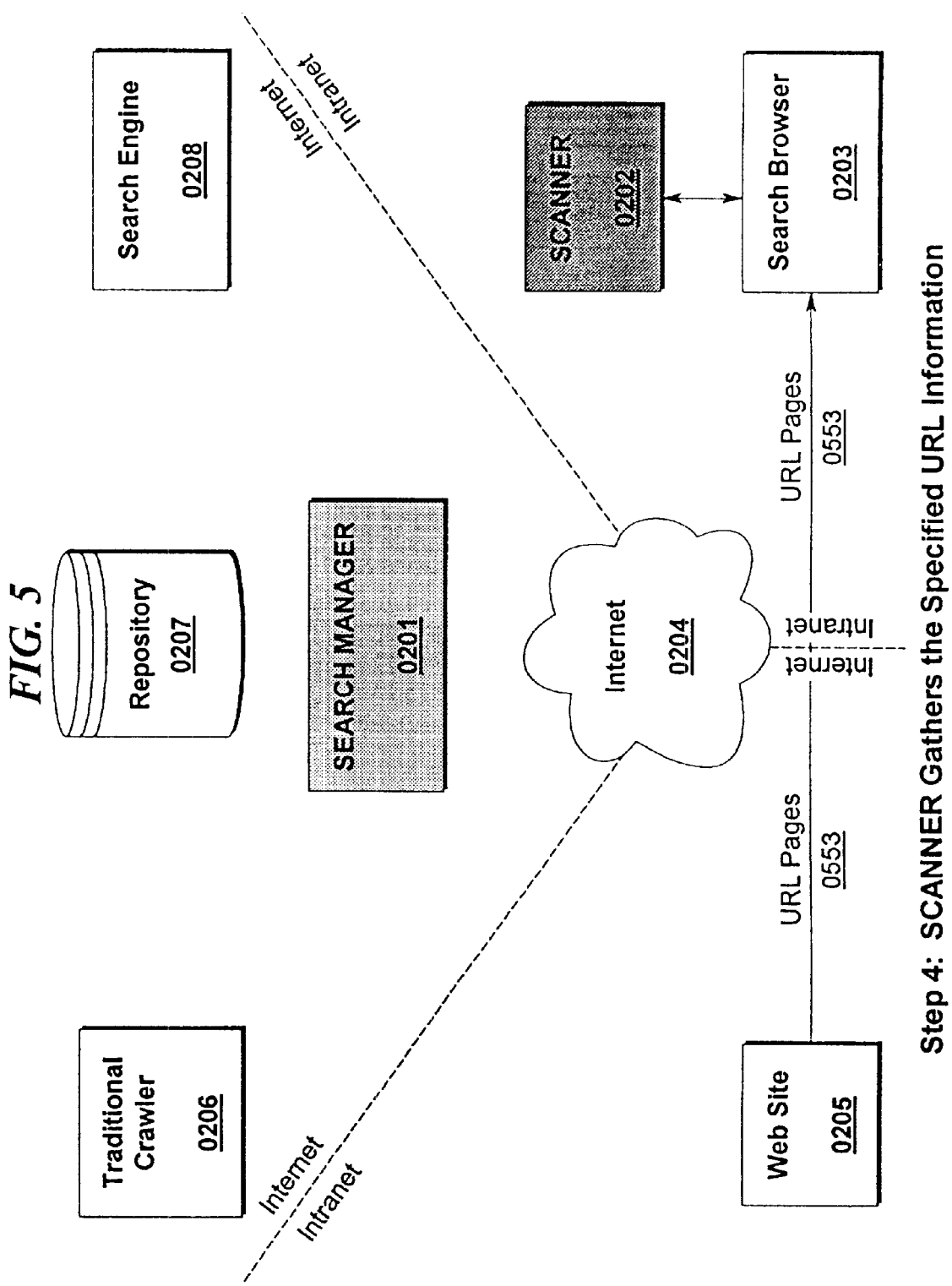
FIG. 5 illustrates a system block data flow diagram of an exemplary embodiment of the present invention, indicating the fourth step of the metadata collection process.

Referencing FIG. 5, the fourth step in the search process requires that the search browser (0203) retrieve the selected URL pages (0553) from the selected web sites (0205). At this point the SCANNER (0202) application scans the URL pages (0553) and summarizes the results.

Figure 6:
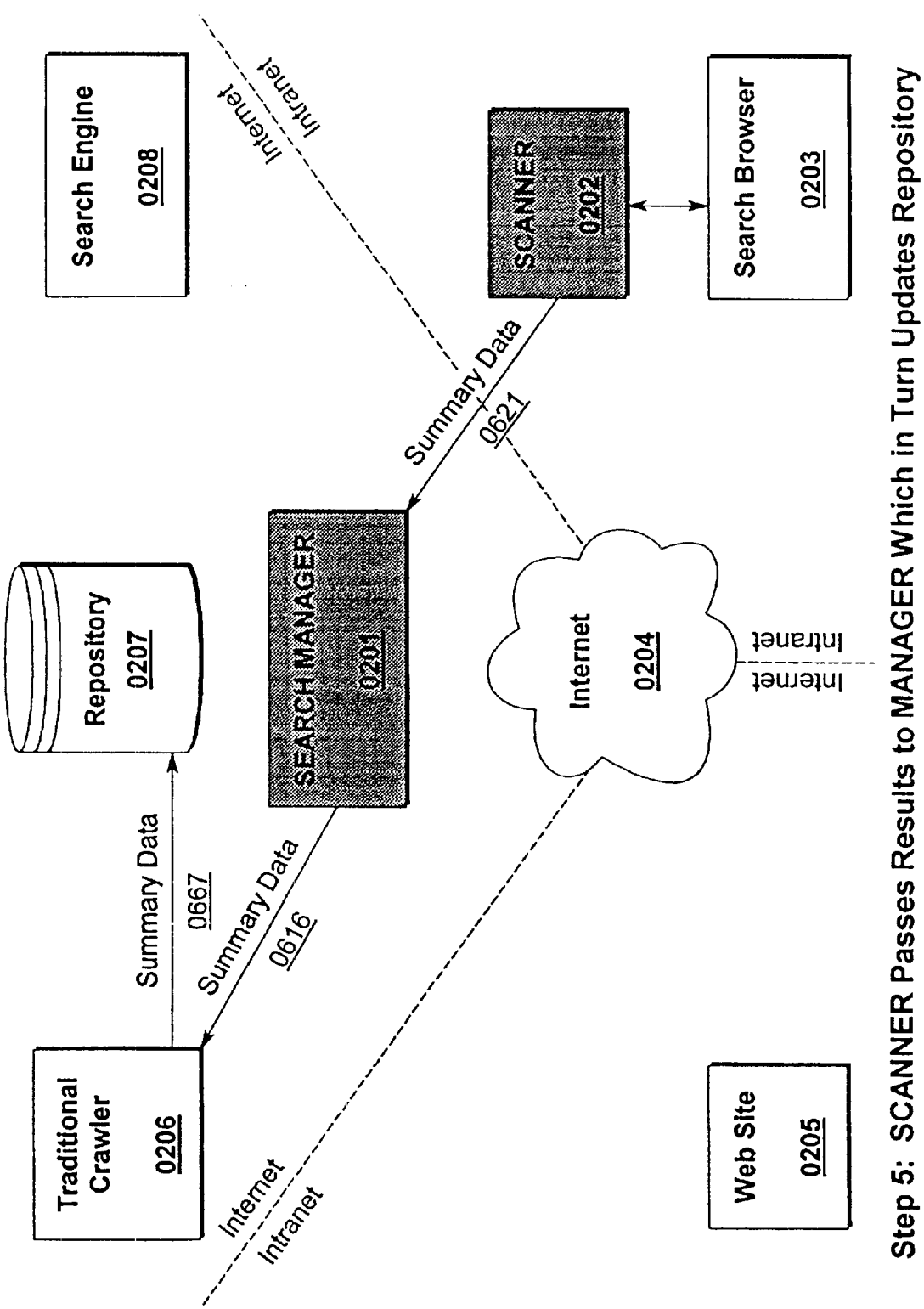
FIG. 6 illustrates a system block data flow diagram of an exemplary embodiment of the present invention, indicating the fifth step of the metadata collection process.
Figure 7:
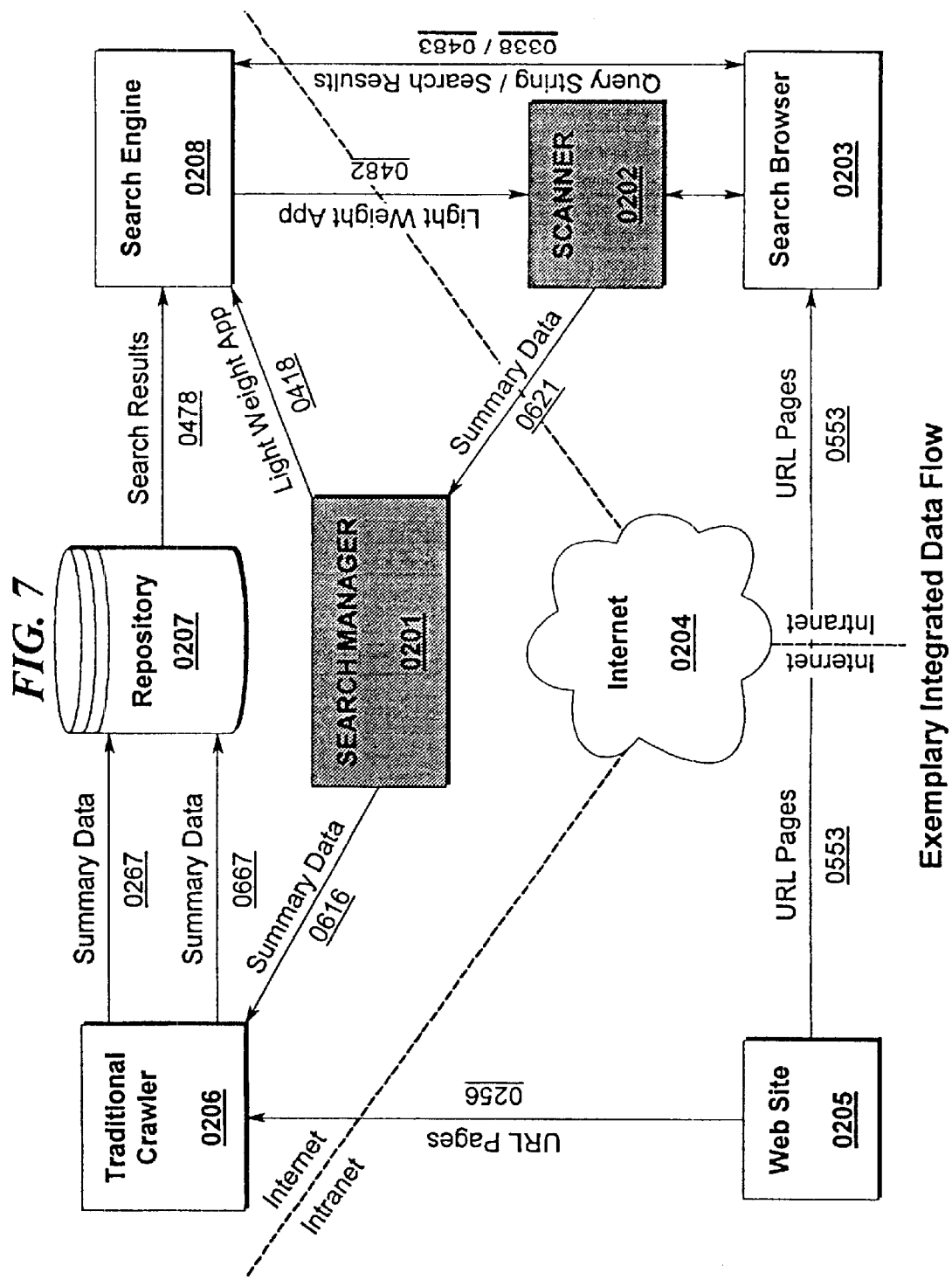
FIG. 7 illustrates a system block data flow diagram of an exemplary embodiment of the present invention, indicating all exemplary steps comprising the metadata collection process.

Referencing FIG. 6, the fifth step in the search process requires that the search browser (0203) pass the summary data (0621) to the search manager (0201) that forwards (0616) it to the web crawler (0206) for incorporation (0667) into the search repository (0207).

The data flow steps 1–5 discussed above and described in FIGS. 2–7 are summarized in FIG. 7. Note that one or more blocks in this diagram may be combined and data flows may be rearranged for efficiency and other considerations with no loss of generality.

Figure 9:
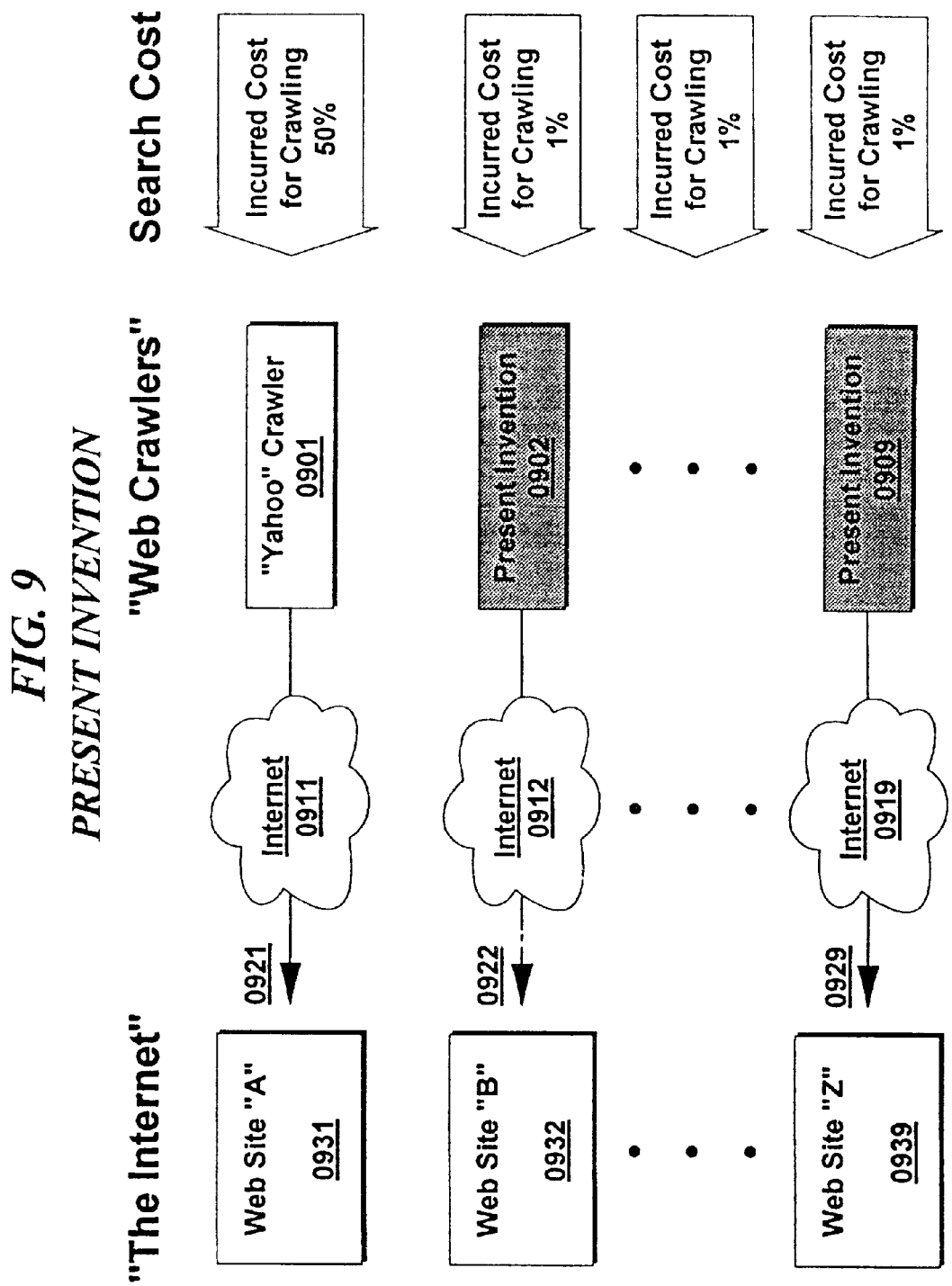
FIG. 9 illustrates an exemplary data flow diagram for the present invention, indicating that the incurred cost of crawling the internet web sites would be reduced using the present invention.
Figure 10:
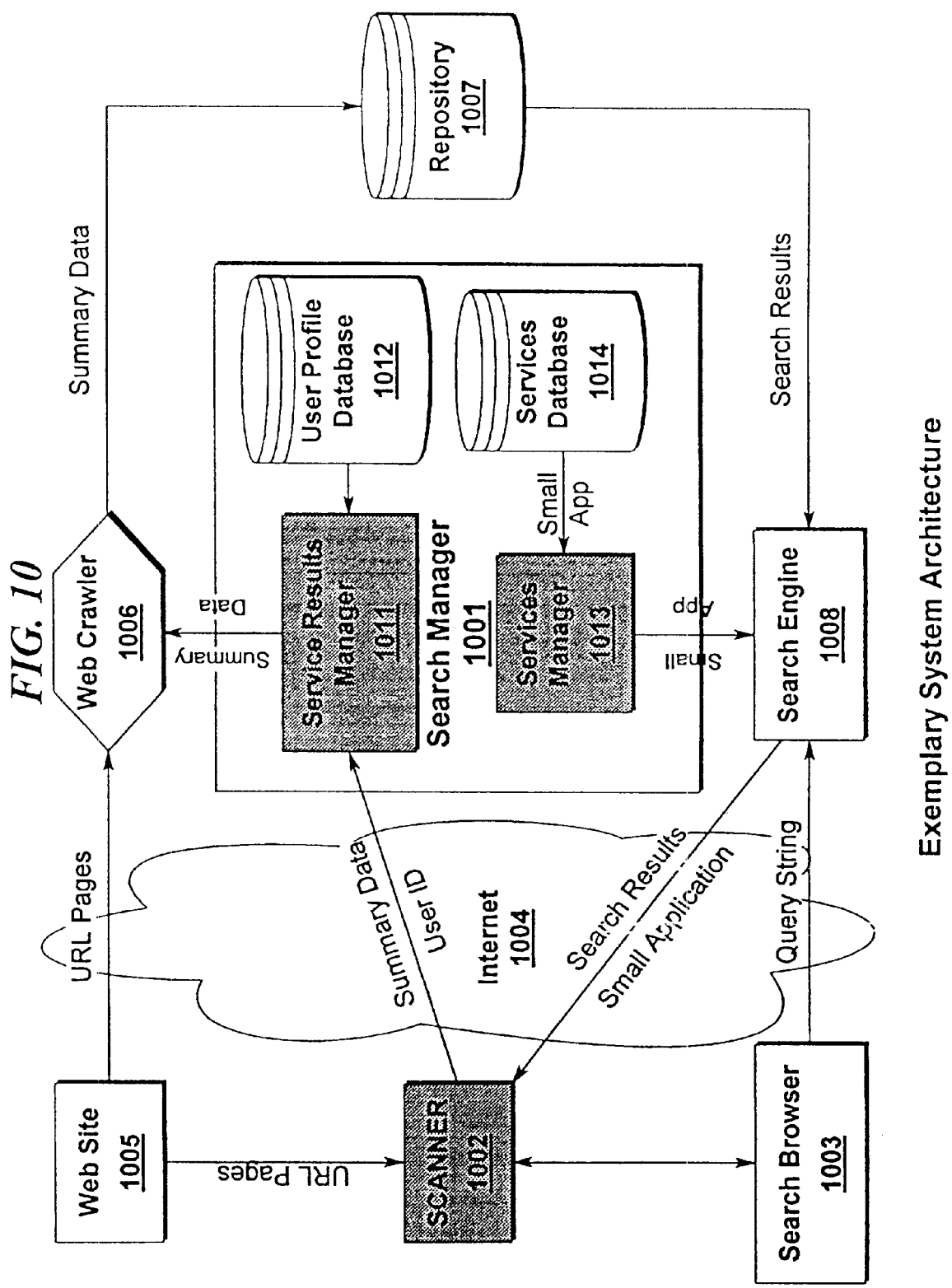
FIG. 10 illustrates a generalized block diagram illustrating an exemplary system architecture for the present invention.

Additionally, it must be noted that the advantage gained by the present invention in general concerns the distribution of the SCANNER task (0202) to the web browser (0203) interface, thus relieving these summary and data processing tasks from the search engine (0208) and web crawler (0206). This distribution of the web searching and crawling task is illustrated graphically in FIG. 9. Within the context of searching the Internet, the use of traditional crawlers (0901) in conjunction with the present invention (0902, 0909) decreases the search cost incurred on the traditional crawler (0901) by permitting other communication resources (0912, 0919), communication channels (0922, 0929), and the like to be utilized in parallel to search the entire range of web sites (0931, 0932, 0939) without burdening the traditional crawler (0901) or it associated search engine.

Process

Figure 8:
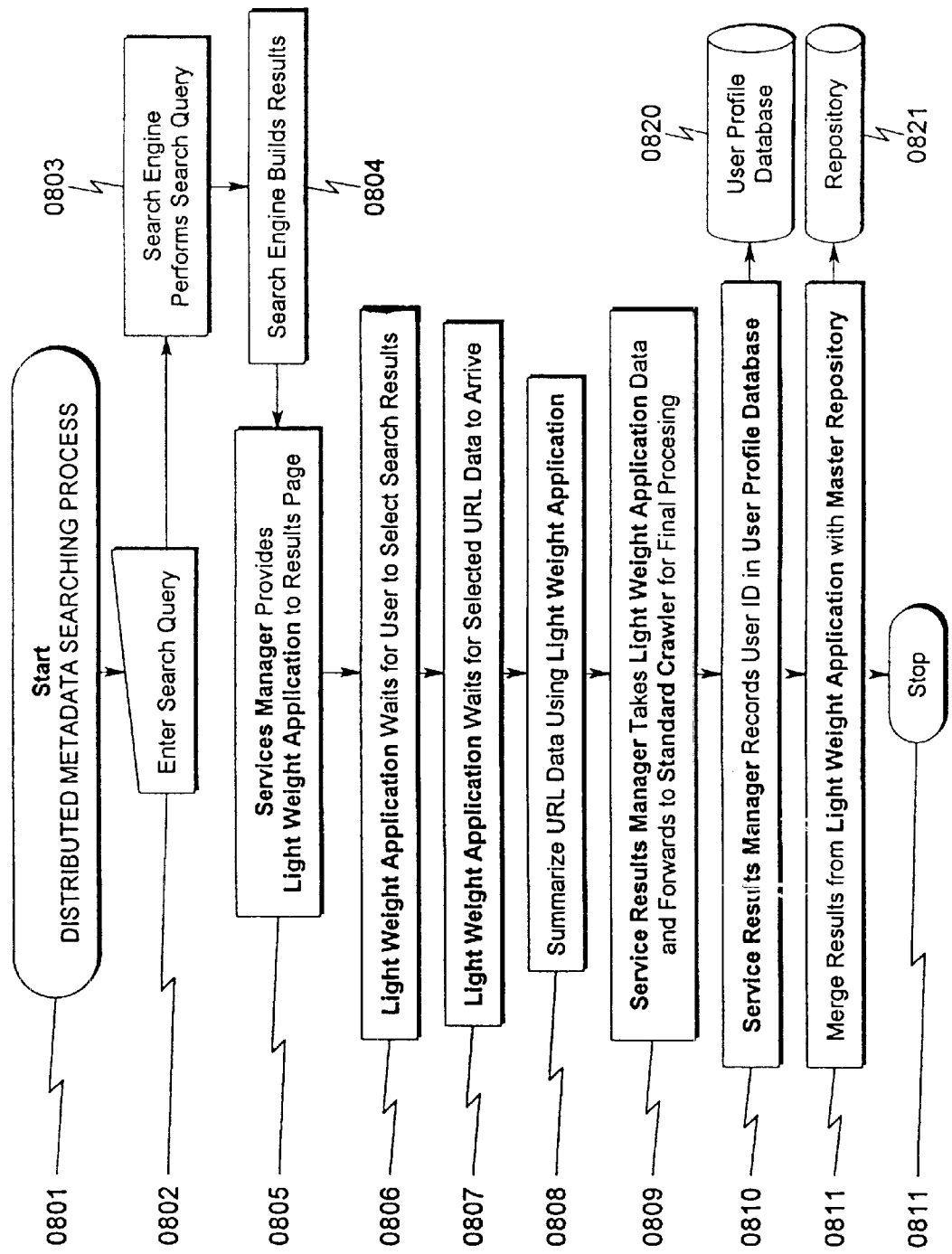
FIG. 8 illustrates an exemplary process flowchart illustrating the general methodology utilized to implement the present invention.

Referring to FIG. 8, the process (0801) begins when the user of the search engine enters a search query (0802), the search engine performs the search query (0803), and the search engine builds the results from this query (0804).

After this is complete, the Services Manager provides a Light Weight Application to the results page (0805). The Light Weight Application will then wait for the user to select from the results (0806). When this occurs this application will wait for the selected URL data to arrive (0807). Once the URL data arrives the data is summarized (0808) and sent to the Service Results Manager.

The Service Results Manager will take the results generated by the Light Weight Application and forward this to the standard crawler for final processing (0809) before being merged with the master repository (0811). The user ID is also recorded in the User Profile Database to monitor which users are providing summary data (0810).

Generalized Exemplary System Architecture

Referring to FIG. 8, the data flows depicted in FIGS. 2–7 may be implemented via a generalized exemplary system having the following components:
1. Search Manager (1001), further comprising
    a) Service Results Manager (1013);
    b) User Profile Database (1012);
    c) Services Manager (1013); and
    d) Services Database (1014).
2. Light Weight Application SCANNER (1002).
3. Search Engine (1008).

The remaining components illustrated in FIG. 8, including the Search Browser (1003), Internet Communications (1004), Web Site(s) (1005), Web Crawler(s) (1006), and Repository (1007) may in some circumstance be incorporated into the system architecture of the present invention, but need not by necessity be included.

This system architecture may be used to advantage in conjunction with the method disclosed below to advantage in producing search repository information with higher efficiency than that possible with prior art technologies.

Computer Software

As would be known by one skilled in the art and as indicated in FIGS. 2–10, the system and method illustrated in FIGS. 2–10 may be reduced to computer instruction codes and embodied on a computer readable storage means. This may take the form of a wide variety of storage media well known in the art and/or contemplated for future use. Thus, the present invention specifically anticipates the incorporation of the system and methods discussed herein in the form of tangible computer software products.

Furthermore, while not limiting the scope of the present invention, the present invention specifically anticipates that one or more components of the present invention may be implemented using the Microsoft™ Windows™ operating environment in all its variations or its equivalent commercial embodiments.

Flow Diagram of Scanner

Figure 11:
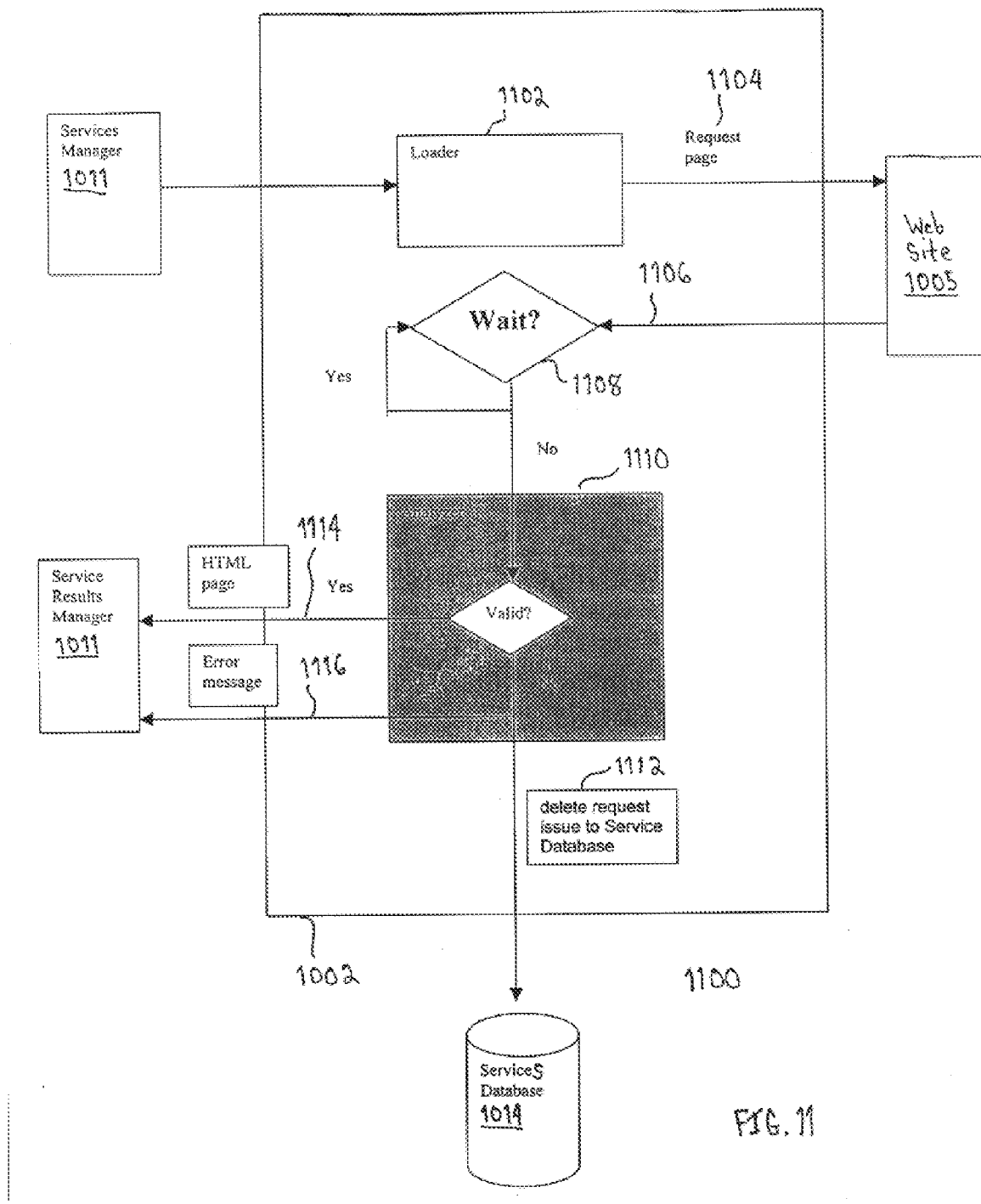
FIG. 11 is a flow diagram of the functions inside the Scanner application.

FIG. 11 is a flow diagram (1100) of the functions inside the Scanner application (1002). The Search Browser 1003 sends the loader (1102) a request for a page (1104) chosen from a list from a search result is sent to Web Site (1005). Now, there are two possible responses from the Web site (1005) to return: (1) no HTML page information; or (2) a HTML page. If no HTML page information is returned, a wait (1108) is performed. Once the wait (1108) is complete, an Analyzer (1110) examines the returned results, if any.

If a valid HTML page is returned (1114) there is one of two possibilities, either the HTML page is the requested site or it is an Error message. If the HTML page is not an Error Message, the Service Results Manager (1011) forwards the results to the Search Browser (1003). If an Error Message (1116), such as 404 error, is returned from the Web Site (1005), this Error Message (1116) is returned to the Search Browser (1003) through Service Results Manager (1011). The function of the Service Results Manager (1011) is described in further detail below.

In the case where no valid HTML page is returned, stated differently, the HTML page from Web Site (1005) is no longer valid, a delete request (1112) is issued to service Database 1014. When a URL reference is removed from the Service Database 1014, the next time the search is performed through a Search Browser 1003 the deleted URL will no longer come up as a search result.

Service Results Manager

Figure 12:
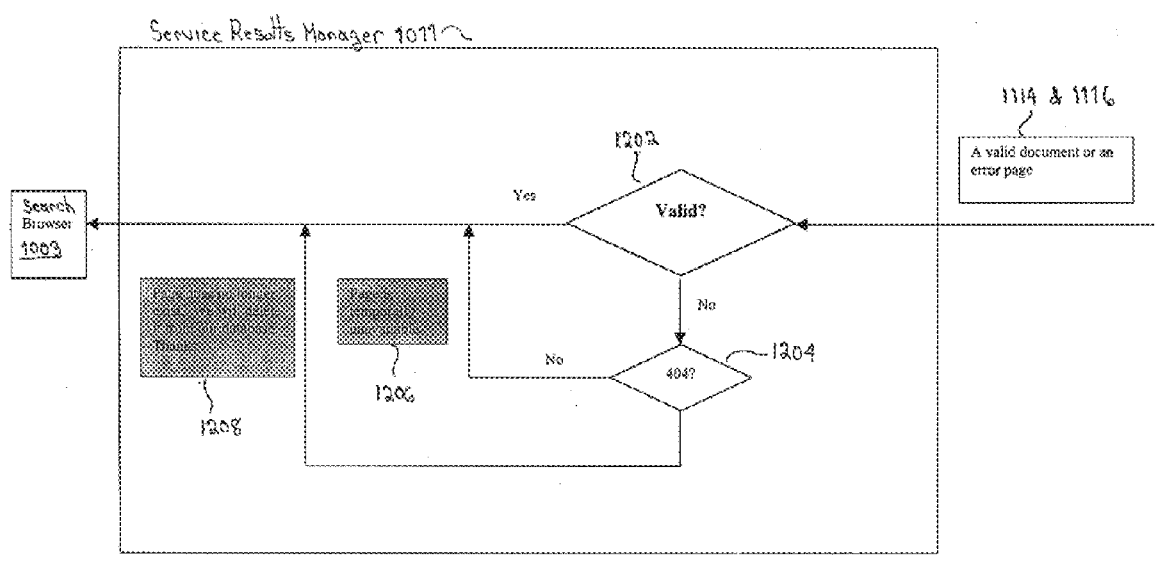
FIG. 12 is a flow diagram of the functions in the Service Results Manager.

FIG. 12 is a flow diagram (1200) of the functions in the Service Results Manager (1011). As described above in FIG. 11, when there is a requested page from a search result list, there are two possible responses from the Web Site (1005), either the page will be displayed or we have an error. If the HTML page is valid (1202), it is simply passed through to the Search Browser (1003). A HTML page that is not valid is check to see if it is a 404 error (1204) is returned from Web Site (1005). Depending on whether the non-valid HTML page is a 404 error a different error message is sent back to the user via Search Browser (1003). A non-valid page, which is not a 404 error reports a message (1206) such as "Page is temporarily unavailable." In the case of a 404 error, the message "Page does no longer exist. We will delete it from our database. Thanks" is sent to Search Browser.

Conclusion

While there exist distributed systems that utilize idle computers and assign tasks, the present invention utilizes more than parallelism to achieve a more robust searching methodology. The main difference between the prior art and the present invention is that the present invention executes the assigned task based on user web searching results and leverages from the document download request generated by the Internet user.

Because the task running on the Internet user's computer is light weight and directly related to the already downloaded document, few computing resources will be consumed with the present invention methodology. This fact together with some other rewards will tend to make the present invention attractive to both users and providers of Internet search engines.

Additionally, since it must be noted in conclusion that the growth of the Internet in recent years has been exponential, the present invention provides one of the few options available to search engine sites to keep up with both the volume of available Internet information, as well as the user demands to search this information.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A metadata searching system comprising:
   a search manager means;
   a scanner means;
   a search engine means;
   wherein
   said scanner means processes metadata and provides summarized data to said search manager means;
   said search manager means augments one or more web crawler repositories utilized by said search engine means in providing search results in response to one or more query string inputs.

2. The metadata searching system of claim 1 wherein one or more components of said system is implemented on a personal computer (PC).

3. The metadata searching system of claim 2 wherein said personal computer (PC) utilizes a graphical user interface.

4. The metadata searching system of claim 3 wherein said graphical user interface utilizes a Microsoft™ Windows™ operating environment.

5. The metadata searching system of claim 1 wherein said search manager means further comprises a service results manager means.

6. The metadata searching system of claim 5 wherein one or more components of said system is implemented on a personal computer (PC).

7. The metadata searching system of claim 6 wherein said personal computer (PC) utilizes a graphical user interface.

8. The metadata searching system of claim 7 wherein said graphical user interface utilizes a Microsoft™ Windows™ operating environment.

9. The metadata searching system of claim 1 wherein said search manager means further comprises a user profile database means.

10. The metadata searching system of claim 9 wherein one or more components of said system is implemented on a personal computer (PC).

11. The metadata searching system of claim 10 wherein said personal computer (PC) utilizes a graphical user interface.

12. The metadata searching system of claim 11 wherein said graphical user interface utilizes a Microsoft™ Windows™ operating environment.

13. The metadata searching system of claim 1 wherein said search manager means further comprises a service manager means.

14. The metadata searching system of claim 13 wherein one or more components of said system is implemented on a personal computer (PC).

15. The metadata searching system of claim 14 wherein said personal computer (PC) utilizes a graphical user interface.

16. The metadata searching system of claim 15 wherein said graphical user interface utilizes a Microsoft™ Windows™ operating environment.

17. The metadata searching system of claim 1 wherein said search manager means further comprises a services database means.

18. The metadata searching system of claim 17 wherein one or more components of said system is implemented on a personal computer (PC).

19. The metadata searching system of claim 18 wherein said personal computer (PC) utilizes a graphical user interface.

20. The metadata searching system of claim 19 wherein said graphical user interface utilizes a Microsoft™ Windows™ operating environment.

21. A metadata searching method comprising:
   entering a search query;
   searching said search query using a Search Engine;
   building results from said Search Engine;
   providing a Light Weight Application to the results page using a Service Manager;
   waiting for the user to select specific search results;
   waiting for the selected URL data to arrive to said Light Weight Application;
   summarizing URL data using said Light Weight Application;
   forwarding said Light Weight Application data via a Service Results Manager to a standard web crawler for further processing;
   recording the user ID in a User Profile Database; and
   merging results from said Light Weight Application with a Master Repository.

22. The metadata searching method of claim 21 wherein one or more steps is implemented on a personal computer (PC).

23. The metadata searching method of claim 22 wherein said personal computer (PC) utilizes a graphical user interface.

24. The metadata searching method of claim 23 wherein said graphical user interface utilizes a Microsoft™ Windows™ operating environment.

25. A metadata searching method comprising:
   means for entering a search query:
   means for searching said search query using a Search Engine;
   means for building results from said Search Engine;
   means for providing a Light Weight Application to the results page using a Service Manager;
   means for waiting for the user to select specific search results;
   means for waiting for the selected URL data to arrive to said Light Weight Application;
   means for summarizing URL data using said Light Weight Application;
   means for forwarding said Light Weight Application data via a Service Results Manager to a standard web crawler for further processing;
   means for recording the user ID in a User Profile Database; and
   means for merging results from said Light Weight Application with a Master Repository.

26. The metadata searching method of claim 25 wherein one or more steps is implemented on a personal computer (PC).

27. The metadata searching method of claim 26 wherein said personal computer (PC) utilizes a graphical user interface.

28. The metadata searching method of claim 27 wherein said graphical user interface utilizes a Microsoft™ Windows™ operating environment.

29. A computer usable medium having computer-readable program code means providing metadata searching automation, said computer-readable program means comprising:

computer program code means for entering a search query;

computer program code means for searching said search query using a Search Engine;

computer program code means for building results from said Search Engine;

computer program code means for providing a Light Weight Application to the results page using a Service Manager;

computer program code means for waiting for the user to select specific search results;

computer program code means for waiting for the selected URL data to arrive to said Light Weight Application;

computer program code means for summarizing URL data using said Light Weight Application;

computer program code means for forwarding said Light Weight Application data via a Service Results Manager to a standard web crawler for further processing;

computer program code means for recording the user ID in a User Profile Database; and computer program code means for merging results from said Light Weight Application with a Master Repository.

30. The computer usable medium of claim 29 wherein said medium is compatible with a personal computer (PC).

31. The computer usable medium of claim 30 wherein said computer code means utilizes a graphical user interface.

32. The computer usable medium of claim 31 wherein said graphical user interface utilizes a Microsoft™ Windows™ operating environment.

* * * * *